United States Patent
Tufail et al.

(10) Patent No.: US 11,187,269 B2
(45) Date of Patent: Nov. 30, 2021

(54) BEARING ASSEMBLY

(71) Applicant: Ford Global Technologies, LLC, Dearborn, MI (US)

(72) Inventors: Khizer Tufail, London (GB); Arup Gangopadhyay, Novi, MI (US); Roland Stark, Hitchin (GB); Thomas Reddyhoff, London (GB); Sorin-Cristian Vladescu, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/639,546

(22) PCT Filed: Jun. 19, 2018

(86) PCT No.: PCT/GB2018/051690
§ 371 (c)(1),
(2) Date: Feb. 14, 2020

(87) PCT Pub. No.: WO2019/034831
PCT Pub. Date: Feb. 21, 2019

(65) Prior Publication Data
US 2021/0131487 A1    May 6, 2021

(30) Foreign Application Priority Data
Aug. 14, 2017 (GB) .................................. 1712976

(51) Int. Cl.
*F16C 33/10* (2006.01)
*F16C 31/02* (2006.01)
(Continued)

(52) U.S. Cl.
CPC .......... *F16C 33/1065* (2013.01); *F16C 31/02* (2013.01); *F16C 33/12* (2013.01);
(Continued)

(58) Field of Classification Search
CPC .. F16C 33/1025; F16C 33/103; F16C 33/106; F16C 33/1065; F16C 33/1085;
(Continued)

(56) References Cited

U.S. PATENT DOCUMENTS

| 6,393,818 | B1* | 5/2002 | Nakagawa | .............. B21C 37/06 |
| | | | | 29/898.1 |
| 2004/0197038 | A1* | 10/2004 | Fujita | ........................ F16C 9/04 |
| | | | | 384/293 |

(Continued)

FOREIGN PATENT DOCUMENTS

| EP | 2803875 A1 | 11/2014 |
| GB | 2361515 A | 10/2001 |

(Continued)

OTHER PUBLICATIONS

ISA European Patent Office, International Search Report Issued in Application No. PCT/GB2018/051690, dated Sep. 13, 2018, WIPO, 5 pages.

*Primary Examiner* — Alan B Waits
(74) *Attorney, Agent, or Firm* — Geoffrey Brumbaugh; McCoy Russell LLP

(57) ABSTRACT

A bearing assembly comprising a first component and a second component, the first and second components being slidably disposed with respect to each other, wherein the first component slides relative to the second component in a first direction,
wherein the first component comprises a plurality of first recesses formed in a first surface facing the second component, wherein the first recesses are distributed in a second direction perpendicular to the first direction with neighboring first recesses being spaced apart in the second direction with a first spacing,
wherein the second component comprises a plurality of second recesses formed in a second surface facing the
(Continued)

first surface of the first component, wherein the second recesses are distributed in the second direction with neighboring second recesses being spaced apart in the second direction with a second spacing, wherein the first recesses are sized to fit within the second spacings and the second recesses are sized to fit within the first spacings, and wherein the first and second components are urged into a relative position in the second direction in which the first and second recesses do not overlap one another.

14 Claims, 5 Drawing Sheets

(51) Int. Cl.
| | |
|---|---|
| *F16C 33/12* | (2006.01) |
| *F16C 17/10* | (2006.01) |
| *F02F 5/00* | (2006.01) |
| *F02F 1/20* | (2006.01) |
| *F16C 17/02* | (2006.01) |

(52) U.S. Cl.
CPC . *F02F 1/20* (2013.01); *F02F 5/00* (2013.01); *F16C 17/02* (2013.01); *F16C 17/10* (2013.01); *F16C 2360/22* (2013.01)

(58) Field of Classification Search
CPC .......... F16C 33/12; F16C 33/24; F16C 31/02; F16C 31/00; F16C 17/10; F16C 17/02; F16C 29/02; F16C 33/10; F16C 2360/22; F16J 1/02; F16J 1/08; F16J 10/04; F01M 9/00; F02F 1/20; F02F 5/00

See application file for complete search history.

(56) References Cited

U.S. PATENT DOCUMENTS

| | | | |
|---|---|---|---|
| 2012/0186561 A1* | 7/2012 | Bethel | F02B 75/282 |
| | | | 123/51 R |
| 2012/0190275 A1 | 7/2012 | Aeschlimann et al. | |
| 2014/0023301 A1 | 1/2014 | Sexton et al. | |
| 2020/0325934 A1* | 10/2020 | Kouno | F16C 33/128 |

FOREIGN PATENT DOCUMENTS

| | | |
|---|---|---|
| JP | 2007321861 A | 12/2007 |
| JP | 2010236649 A | 10/2010 |

* cited by examiner

BEARING ASSEMBLY

CROSS-REFERENCE TO RELATED APPLICATIONS

The present application is a U.S. National Phase of International Patent Application Serial No. PCT/GB2018/051690 entitled "A BEARING ASSEMBLY," filed on Jun. 19, 2018. International Patent Application Serial No. PCT/GB2018/051690 claims priority to British Patent Application No. 1712976.8 filed on Aug. 14, 2017. The entire contents of each of the above-referenced applications are hereby incorporated by reference for all purposes.

TECHNICAL FIELD

This disclosure relates generally to a bearing assembly and particularly, although not exclusively, relates to a bearing assembly comprising first and second sliding components having recesses in respective interface surfaces, the first and second component recesses being offset from one another as the first and second components slide relative to each other.

BACKGROUND

A bearing assembly typically allows one part to rotate or move with respect to another part, ideally with as little friction as possible. By way of example, a bearing assembly may support a rotating shaft. In another example, a bearing assembly may support parts moving linearly with respect to each other, such as in an internal combustion engine, which typically has one or more reciprocating pistons slidably disposed within a cylinder bore.

Sliding surfaces are typically lubricated to reduce the friction. However, lubricated sliding contacts, such as between piston rings of the piston and an inner surface of the cylinder bore, have frictional losses due to the shear forces generated in the lubricant, contact between surface asperities, and a solid chemical film generated by additives in the lubricant.

It is desirable to reduce the friction between the piston rings and the inner surface of the cylinder in order to increase the efficiency of the engine and reduce wear on engine components. The friction between the components may be determined by a number of factors, which include the operational parameters of the engine and the configuration of each of the sliding surfaces. For example, the frictional coefficient between sliding components may be determined using the Stribeck curve, which is used to categorize the frictional properties between two surfaces as a function of the viscosity of the lubricant and the relative speed between the components per unit load. As such, friction may be minimized by operating at the minimum point on the Stribeck curve, which defines the transition between hydrodynamic lubrication and mixed lubrication. However, it is difficult to maintain operation at the minimum point on the Stribeck curve across the full piston stroke as a result of the low relative speed between the piston and the cylinder at the extremes of the range of movement of the piston.

Similar considerations apply for other bearing assemblies and the present disclosure seeks to minimize the friction between bearing components.

STATEMENTS OF INVENTION

According to an aspect of the present disclosure, there is provided a bearing assembly comprising a first component and a second component, the first and second components being slidably disposed with respect to each other, wherein the first component slides relative to the second component in a first direction, wherein the first component comprises a plurality of first recesses formed in a first surface facing the second component, wherein the first recesses are distributed in a second direction perpendicular to the first direction with neighbouring first recesses being spaced apart in the second direction with a first spacing, wherein the second component comprises a plurality of second recesses formed in a second surface facing the first surface of the first component, wherein the second recesses are distributed in the second direction with neighbouring second recesses being spaced apart in the second direction with a second spacing, and wherein the first recesses are sized to fit within the second spacings and the second recesses are sized to fit within the first spacings.

The first recesses may be staggered or interspersed relative to the second recesses. The first recesses may or may not be aligned with one another in the second direction. Similarly, the second recesses may or may not be aligned with one another in the second direction.

The bearing assembly may be configured to receive a film of lubricant between the first and second surfaces. The first and second recesses may be configured to receive the lubricant. The first and second recesses may be offset such that the lubricant is not able to flow directly between the first and second recesses.

The first and second components may be urged, e.g. biased, into a relative position in the second direction in which the first and second recesses do not overlap one another. The first and second components may be urged into the non-overlapping position by virtue of an interaction between the first and second components.

The first and second components may be constrained relative to each other in the second direction, e.g. so that the first and second recesses may not overlap. The first and second components may be constrained relative to each other, e.g. by virtue of corresponding abutment surfaces on or connected to the first and second components.

Alternatively, the second component may be free to move in the second direction relative to the first component. The first and second components may be urged, e.g. biased, into a relative position in the second direction in which the first and second recesses do not overlap one another by virtue of changing frictional forces as the second component moves in the second direction relative to the first component. For example, frictional forces in the first direction as the first component slides relative to the second component in the first direction may increase when the first and second recesses overlap as a hydrodynamic film supported by the recesses may be compromised by the overlapping first and second recesses. Such an increase in the frictional forces may favor the first and second recesses being in a non-overlapping state in which the frictional forces are lower. Perturbations to the relative position of the first and second components in the second direction may assist in biasing the first and second components to the non-overlapping state in which the frictional forces are lower.

There may be one or more rows of first recesses. For example, the first component may comprise a plurality of rows of first recesses. Each row of first recesses may comprise a plurality of first recesses distributed in the second direction. First recesses in a particular row may or may not be aligned with one another in the second direction.

First recesses across the plurality of rows may be aligned with one another in the first direction.

There may be one or more rows of second recesses. For example, the second component may comprise a plurality of rows of second recesses. Each row of second recesses may comprise a plurality of second recesses distributed in the second direction. Second recesses in a particular row may or may not be aligned with one another in the second direction. Second recesses across the plurality of rows may be aligned with one another in the first direction.

The first component may move linearly relative to the second component, e.g. the first component may reciprocate relative to the second component. The first direction may be aligned with the direction of reciprocation.

A piston assembly may comprise the first component. A cylinder may comprise the second component. The piston assembly may be configured to reciprocate in the cylinder. One of a piston and piston ring of the piston assembly may comprise the first surface. A cylinder wall of the cylinder may comprise the second surface.

The first component may rotate relative to the second component about an axis of rotation. The first direction may be perpendicular to the axis of rotation. The first direction may be aligned with a circumferential direction about the axis of rotation.

A first bearing component may comprise the first component and a second bearing component may comprise the second component.

The first and second components may be both at least partially cylindrical. The first direction may be aligned with a longitudinal axis of the at least partially cylindrical first and second components. Alternatively, the first direction may be aligned with a circumferential direction of the at least partially cylindrical first and second components.

The first recess may have a width in the second direction that is substantially equal to a width of the second recess in the second direction. Alternatively, the first recess may have a width in the second direction that is different from a width of the second recess in the second direction.

The first recess may have a width in the second direction that is substantially equal to the second spacing. The second recess may have a width in the second direction that is substantially equal to first spacing. Alternatively, the first recess may have a width in the second direction that is less than the second spacing and/or the second recess may have a width in the second direction that is less than the first spacing. The difference between the first recess width and the second spacing and the difference between the second recess width and the first spacing may be greater than the relative positional tolerance between the first and second components in the second direction.

The first and second recesses may be distributed in the second direction with corresponding frequencies, e.g. number of recesses per unit length in the second direction. The sum of the first spacing and first recess width may correspond to the sum of the second spacing and second recess width.

The first spacing may be substantially constant, e.g. for each pair of neighbouring first recesses. The second spacing may be substantially constant, e.g. for each pair of neighbouring second recesses.

An internal combustion engine, reciprocating machine or rotating machine may comprise the above-mentioned bearing assembly.

According to an aspect of the present disclosure, there is provided a method for a bearing assembly comprising a first component and a second component, the first and second components being slidably disposed with respect to each other, wherein the first component slides relative to the second component in a first direction, wherein the method comprises:

providing the first component with a plurality of first recesses in a first surface configured to face the second component, wherein the first recesses are distributed in a second direction perpendicular to the first direction with neighbouring first recesses being spaced apart in the second direction with a first spacing; and providing the second component with a plurality of second recesses in a second surface configured to face the first surface of the first component, wherein the second recesses are distributed in the second direction with neighbouring second recesses being spaced apart in the second direction with a second spacing, wherein the first recesses are sized to fit within the second spacings and the second recesses are sized to fit within the first spacings.

The method may further comprise urging the first and second components into a relative position in the second direction in which the first and second recesses do not overlap one another.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
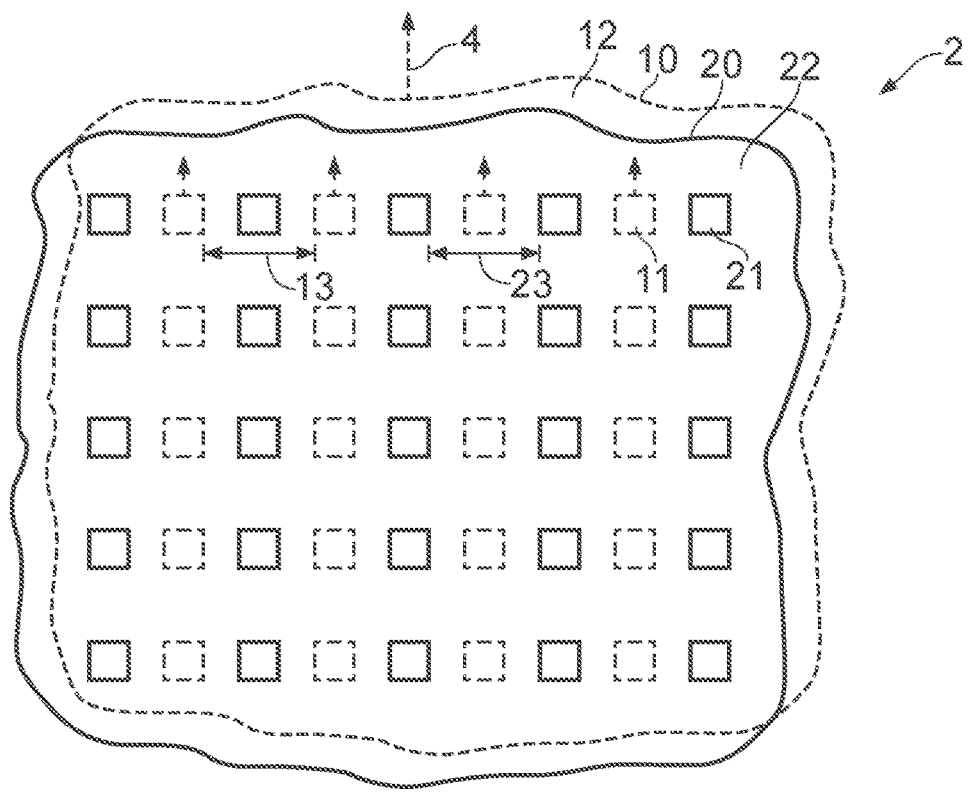
FIG. 1 shows a partial schematic view of a bearing assembly according to an arrangement of the present disclosure.
Figure 2:
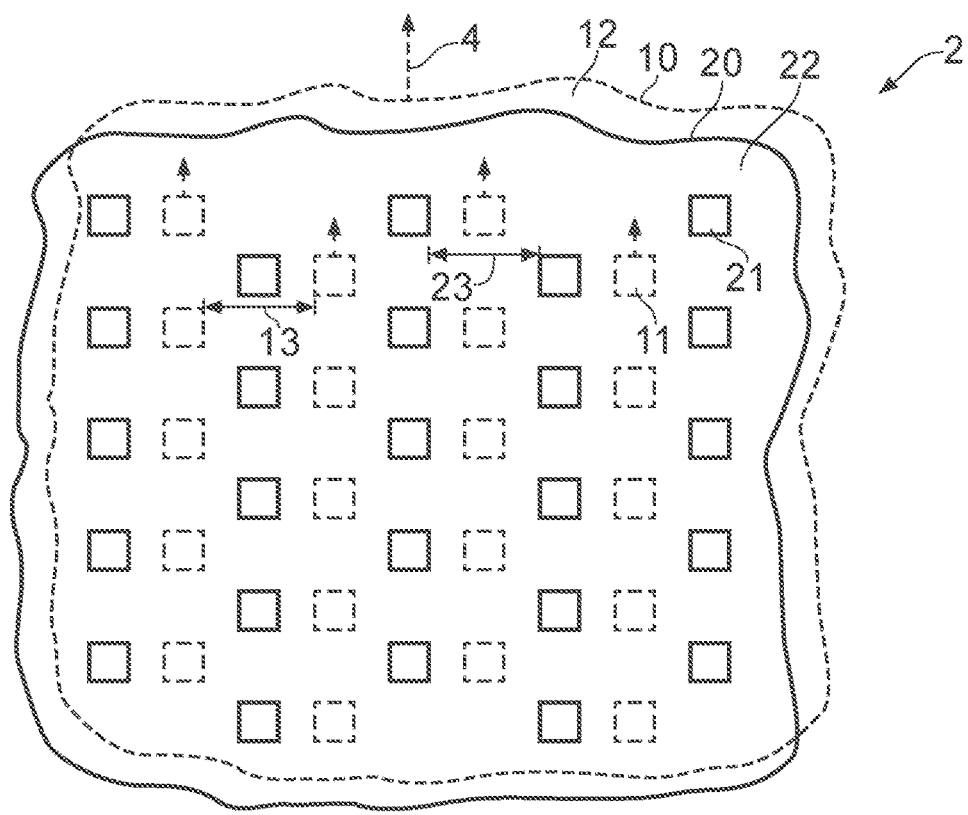
FIG. 2 shows a partial schematic view of a bearing assembly according to an arrangement of the present disclosure.

With reference to FIGS. 1 and 2, a bearing assembly 2 according to arrangements of the present disclosure comprises a first component 10 and a second component 20. The first and second components 10, 20 are slidably disposed with respect to each other with the first component 10 sliding relative to the second component 20 in a first direction 4.

The first component 10 comprises a plurality of first recesses 11 formed in a first surface 12 facing the second component 20. The first recesses 11 are distributed in a second direction perpendicular to the first direction 4. Neighbouring first recesses 11 are spaced apart in the second direction with a first spacing 13.

The second component 20 comprises a plurality of second recesses 21 formed in a second surface 22 facing the first surface 12 of the first component 10. The second recesses 21 are distributed in the second direction. Neighbouring second recesses 21 are spaced apart in the second direction with a second spacing 23.

The first and second recesses 11, 21 may form discrete indentations into the respective first and second surfaces 12, 22. The recesses 11, 21 may be closed at their bottoms. The recesses 11, 21 may be of any shape, for example they may be square, rectangular, circular, rounded oblongs or any other shape.

The first recesses 11 of the first component 10 are sized to fit within corresponding second spacings 23 between the second recesses 21 of the second component 20. Likewise, the second recesses 21 of the second component 20 are sized to fit within corresponding first spacings 13 between the first recesses 11 of the first component 10. Accordingly, the first recesses 11 may be interspersed between the second recesses 21 in the second direction, e.g. the first and second recesses 11, 21 may alternate in the second direction. As the first component 10 moves relative to the second component 20 in the first direction, the first and second recesses 11, 21 retain the mutual interspersed relationship.

There may be one or more rows of first recesses 11 (a row being perpendicular to the first direction). In the arrangement depicted, the first component 10 comprises a plurality of rows of first recesses 11. Each row of first recesses 11 may comprise a plurality of first recesses 11 distributed in the second direction. Similarly, there may be one or more rows of second recesses 21 and in the arrangement depicted, the second component 20 comprises a plurality of rows of second recesses 21. Each row of second recesses 21 may comprise a plurality of second recesses 21 distributed in the second direction. (For completeness, it is noted that there may be a single row of first recesses and a plurality of rows of second recesses or vice versa.)

First recesses 11 across the plurality of rows may be aligned with one another in the first direction 4. Second recesses 21 across the plurality of rows may be aligned with one another in the first direction 4. Alignment of the recesses in the first direction helps to maintain the mutual interspersed relationship as the first component 10 moves relative to the second component 20 in the first direction 4.

As depicted in FIG. 1, the first recesses 11 within a particular row may be aligned with one another in the second direction. Similarly, the second recesses 21 within a particular row may be aligned with one another in the second direction. However, as depicted in FIG. 2, the first recesses 11 may not be aligned with one another in the second direction and the second recesses 21 may not be aligned with one another in the second direction. In other arrangements (not depicted), the first recesses may be aligned in the second direction and the second recesses may not be aligned in the second direction or vice versa.

Figure 3:
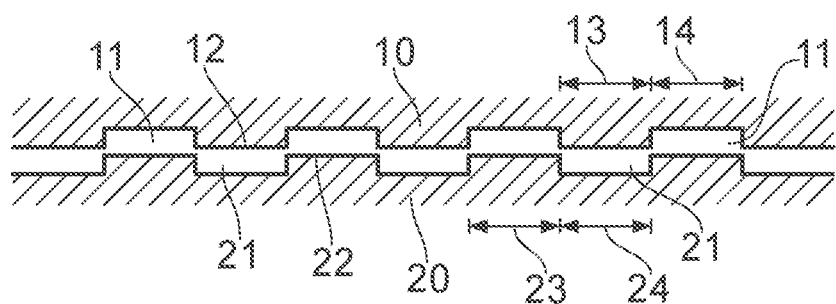
FIG. 3 shows a partial side sectional view of a bearing assembly according to an arrangement of the present disclosure.
Figure 4:
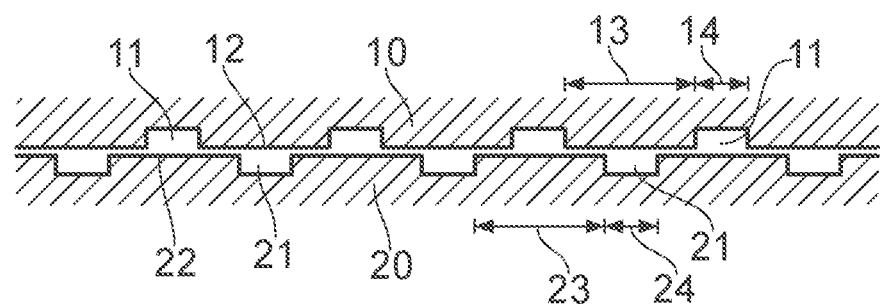
FIG. 4 shows a partial side sectional view of a bearing assembly according to an arrangement of the present disclosure.

Referring now to FIGS. 3 and 4, which depict partial side sectional views of the first and second components 10, 20, the first recess 11 may have a width 14 in the second direction that is substantially equal to a width 24 of the second recess 21 in the second direction. However, in alternative arrangements (not depicted), the width 14 of the first recesses 11 may be different from the width 24 of the second recesses 21.

As shown in FIG. 3, the width 14 of the first recess 11 may be substantially equal to the opposite second spacing 23 between second recesses 21. Likewise, the width 24 of the second recess 21 may be substantially equal to the opposite first spacing 13 between first recesses 11.

Alternatively, as shown in FIG. 4, the width 14 of the first recess 11 may be less than the opposite second spacing 23 and the width 24 of the second recess 21 may be less than the opposite first spacing 13. The difference between the second spacing 23 and the first recess width 14 and the difference between the first spacing 13 and the second recess width 24 may be greater than the relative positional tolerance between the first and second components in the second direction. In this way, any overlap between the first and second recesses may be avoided regardless of the ultimate relative position of the first and second components in the second direction within their positional tolerance range.

Referring again to both FIGS. 3 and 4, the first and second recesses 11, 21 may be distributed in the second direction with corresponding (e.g. equal) frequencies, e.g. number of recesses per unit length in the second direction. In other words, the sum of the first spacing 13 and first recess width 14 may correspond to the sum of the second spacing 23 and second recess width 24. The distribution frequency is depicted as being constant in the second direction, but it may also vary in the second direction.

Although the first spacings 13 are depicted as being constant, the first spacings 13 may vary in the second direction from one pair of first recesses 11 to another pair of first recesses 11. This may occur due to a change in the distribution frequency and/or a change in the first recess width 14. Likewise, although the second spacings 23 are depicted as being constant, the second spacings 23 may vary in the second direction from one pair of second recesses 21 to another pair of second recesses 21. This may occur due to a change in the distribution frequency and/or a change in the second recess width 24.

The bearing assembly 2 may receive a film of lubricant between the first and second surfaces 12, 22. The first and second recesses 11, 21 may be configured to receive the lubricant. The recesses 11, 21 may comprise any type of opening or depression in the respective surface that enables the lubricant to be held within the recess as the opposite surface moves over the recess. For example, the recesses may comprise a plurality of discrete pockets shaped to retain lubricant, and/or decrease the rate at which lubricant drains away from the contact zones. The first and second recesses 11, 21 may be offset from one another such that the lubricant is not able to flow directly between the first and second recesses.

The first and second surfaces 12, 22 may be flat, e.g. in the case of a linear bearing. However, with reference to FIGS. 5 to 9, the first and second surfaces 12, 22 may be curved, e.g. with corresponding curvatures so that the first and second surfaces may slide relative to one another. For example, the first and second components 10, 20 may both define at least partially cylindrical surfaces, which correspond to the first and second surfaces 12, 22. As mentioned above, the first component 10 may move in the first direction 4 relative to the second component 20. In the case of the first and second surfaces being at least partially cylindrical, the first direction 4 may be aligned with a longitudinal axis of the cylindrical surfaces; aligned with a circumferential direction of the cylindrical surfaces; or aligned with a combination of the longitudinal and circumferential directions (e.g. if one component moves in a spiral relative to the other component).

Figure 5:
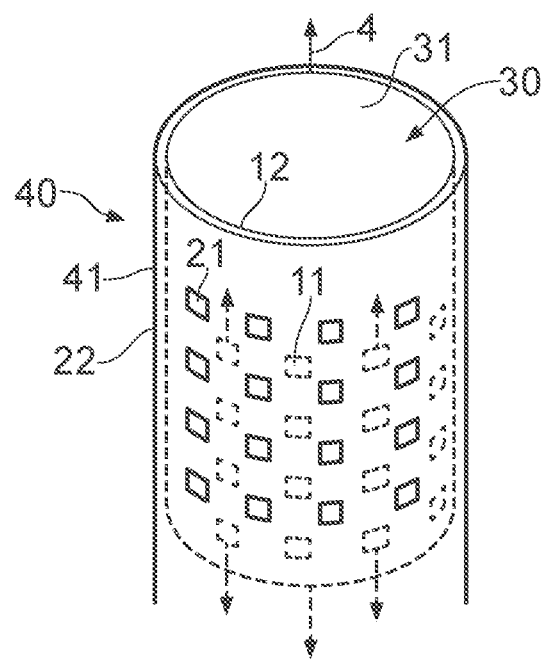
FIG. 5 shows a schematic perspective view of a bearing assembly according to an arrangement of the present disclosure.
Figure 6:
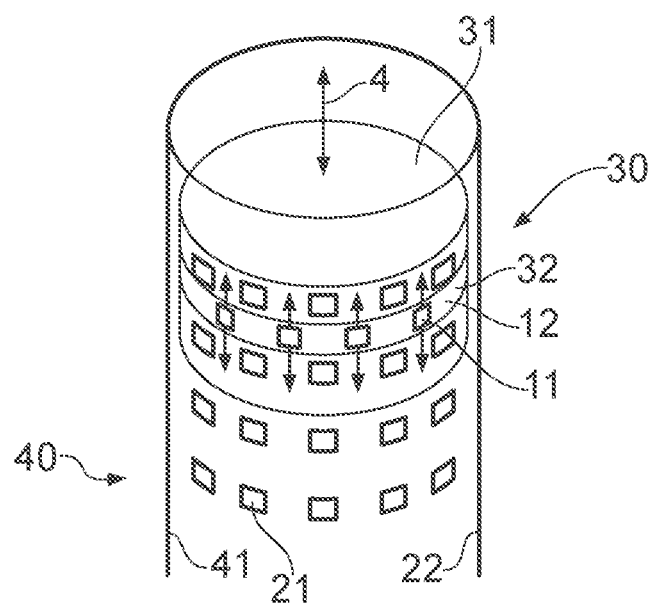
FIG. 6 shows a schematic perspective view of a bearing assembly according to an arrangement of the present disclosure.
Figure 7:
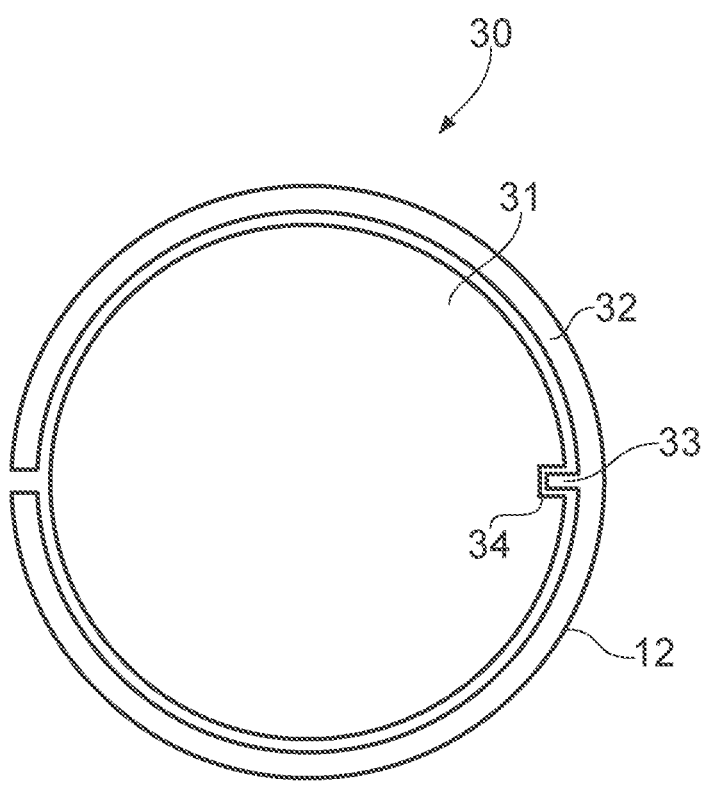
FIG. 7 shows a schematic sectional view of the bearing assembly depicted in FIG. 6.

With particular reference to FIGS. 5 and 6, the first component 10 may move linearly relative to the second component 20. In the particular arrangement shown, a shaft or piston assembly 30 may comprise the first component 10 and a bore or cylinder assembly 40 may comprise the second component 20. The piston/shaft and cylinder/bore assemblies 30, 40 may be provided in an internal combustion engine, a reciprocating engine, a reciprocating pump or any other machine with a piston or shaft that slidably reciprocates in a bore of the machine (such as a valve stem or push rod). Accordingly, the piston assembly 30 may reciprocate relative to the cylinder assembly 40 such that the first component 10 may also reciprocate relative to the second component 20. As mentioned above, the first component 10 may move in the first direction 4 relative to the second component 20 and the first direction 4 may be aligned with the direction of reciprocation.

The cylinder assembly 40 comprises an inner cylinder wall 41 configured to engage the piston assembly 30. The inner cylinder wall 41 may be an inner surface of a cylinder bore formed directly into a cylinder block or an inner surface of a cylinder liner that is assembled into the cylinder block.

In either of the arrangements depicted in FIGS. 5 and 6, the cylinder wall 41 of the cylinder assembly 40 may comprise the second surface 22 with the second recesses 21. The second recesses 21 are distributed in a circumferential direction, which corresponds to the second direction described above. In addition, multiple rows of second recesses 21 may be axially distributed along the length of the cylinder wall. (It should be noted that the recess dimensions and spacings depicted in all of the Figures are schematic and may be much smaller than those shown.)

In the particular arrangement shown in FIG. 5, a piston 31 of the piston assembly 30 may comprise the first surface 12 with the first recesses 11. The first recesses 11 are distributed in the circumferential direction, which corresponds to the second direction described above. The first and second recesses 11, 21 may alternate in the circumferential direction. In addition, multiple rows of first recesses 11 may be axially distributed along at least a length of the piston 31.

By contrast, in the arrangement shown in FIG. 6, one or more piston rings 32 of the piston assembly 30 may comprise the first surface 12 with the first recesses 11. It will be appreciated that the or each piston ring 32 comprises a circumferential surface configured to engage the cylinder wall 41. The first recesses 11 are distributed in the circumferential direction, which corresponds to the second direction described above. The first and second recesses 11, 21 may alternate in the circumferential direction. In addition, one or more rows of first recesses 11 may be axially distributed across the thickness of the piston ring 32. Although only one piston ring 32 is depicted, the piston assembly 30 may have any appropriate number of piston rings and any number of those piston rings may comprise the first surface 12 with the first recesses 11.

As mentioned above, a film of lubricant may be provided between the first and second surfaces 12, 22 to reduce the friction between the sliding first and second components 10, 20. The first and second recesses 11, 21 may help maintain the lubricant film at a contact zone between the first and second components 10, 20. To maximise effectiveness, lubricant may be restricted from "leaking" out of the recesses. In the case of the arrangement depicted in FIG. 6, the size of the contact zone between the piston ring 32 and cylinder wall 41 in the longitudinal direction of the cylinder may be larger than the corresponding dimension of the first and second recesses 11, 21. Also, with any of the arrangements, the first and second components 10, 20 may be urged, e.g. biased, into a relative position in the second direction in which the first and second recesses 11, 21 do not overlap one another so as to limit the extent to which lubricant can pass between the first and second recesses.

In the case of the reciprocating piston 31 depicted in FIG. 6, the piston 31 may be constrained from moving in the circumferential direction by an associated connecting rod and crank shaft (not depicted). Such an arrangement may maintain the relative non-overlapping positions of the first and second recesses 11, 21. (As mentioned above, the spacings 13, 23 may be selected to account for the positional tolerance of the first and second components in the second direction.)

However, in the case of the piston assembly 30 being provided with a piston ring 32, previously-proposed piston rings may be free to rotate in the circumferential direction. Accordingly, with reference to FIG. 7, rotation of the piston ring 32 may be restricted by a protrusion 33 extending from the piston ring 32 into a recess 34 in the piston 31. The protrusion 33 may comprise one or more abutment surfaces that engage corresponding abutment surfaces in the recess 34 and serve to limit rotation of the piston ring 32 relative to the piston 31. (Alternatively, the piston 31 may comprise the protrusion and the piston ring 32 may comprise the recess.) As rotation of the piston 31 relative to the cylinder wall 41 may be separately constrained (e.g. by the connecting rod and crank assembly), the circumferential position of the piston ring 32 is also constrained relative to the cylinder wall 41. In this way, the first and second recesses 11, 21 on the respective piston ring 32 and cylinder wall 41 may be maintained in the non-overlapping positions.

In an alternative arrangement, the piston ring 32 may remain free to rotate in the circumferential direction relative to the piston 31 and cylinder wall 41. (In other words, the protrusion 33 and recess 34 may be omitted.) The piston ring 32 may be urged, e.g. biased, into a circumferential position relative to the cylinder wall 41 in which the first and second recesses 11, 21 do not overlap by virtue of changing frictional forces as the piston ring 32 moves in the circumferential direction. For example, frictional forces in the first direction 4 as the piston 31 slides relative to the cylinder wall 41 may increase when the first and second recesses 11, 21 overlap due to the hydrodynamic film supported by the recesses being compromised by the overlapping first and second recesses. Such an increase in the frictional forces may favour the first and second recesses 11, 21 being in a non-overlapping state in which the frictional forces are lower (as systems will tend towards a lower energy state). For example, perturbations to the circumferential position of the piston ring 32, which may occur during use, may assist in biasing the piston ring into the non-overlapping state in which the frictional forces are lower, since perturbations towards the lower friction position may be favoured over perturbations towards a higher friction position. In this way the piston ring 32 may tend to move towards a relative positon in which the first and second recesses 11, 21 do not overlap. Although, it is possible that the first and second recesses 11, 21 may overlap in use, it is anticipated that the first and second recesses will predominantly not overlap and that a greater benefit will be achieved than if recesses had only been provided on a single surface.

Figure 8:
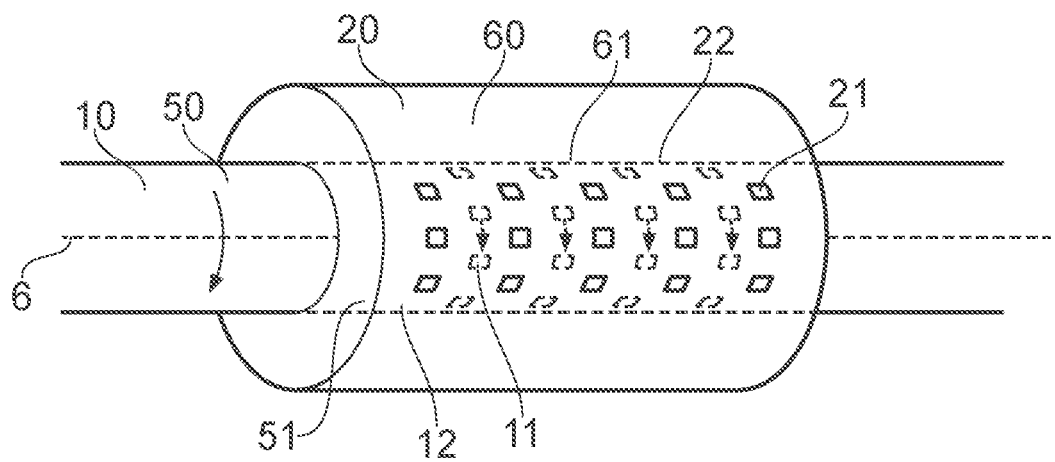
FIG. 8 shows a schematic perspective view of a bearing assembly according to an arrangement of the present disclosure.
Figure 9:
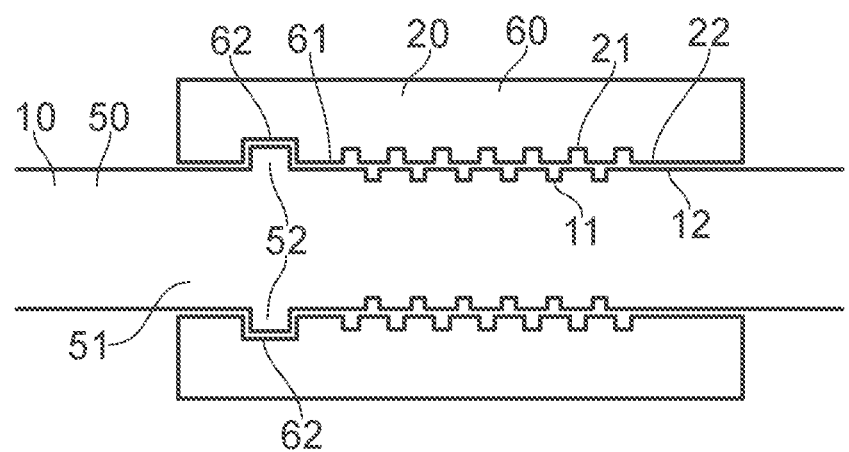
FIG. 9 shows a schematic sectional view of the bearing assembly depicted in FIG. 8.

With reference to FIG. 8, instead of moving in a linear fashion, the first component 10 may rotate relative to the second component 20 about an axis of rotation 6. The first direction 4 mentioned above with respect to FIGS. 1 and 2 may be perpendicular to the axis of rotation, e.g. the first direction 4 may be aligned with a circumferential direction about the axis of rotation 6. In the particular example shown, a first rotational bearing component 50 may comprise the first component 10 and a second rotational bearing component 60 may comprise the second component 20. The first and second rotational bearing components 50, 60 may together form a rotational bearing, such as a journal bearing, e.g. a fluid journal bearing.

A cylindrical inner wall 61 of the second rotational bearing component 60 may comprise the second surface 22 with the second recesses 21. The second recesses 21 are distributed in an axial direction, which corresponds to the second direction described above. Furthermore, a shaft portion 51 of the first rotational bearing component 50 may comprise the first surface 12 with the first recesses 11. The shaft portion 51 may be supported by and may interface with the inner wall 61. The first recesses 11 are distributed in the axial direction, which corresponds to the second direction described above. The first and second recesses 11, 21 may alternate in the direction of the rotational axis 6. In addition, multiple rows of second recesses 21 may be circumferentially distributed about the circumference of the inner wall and multiple rows of first recesses 11 may be circumferentially distributed about the circumference of the shaft portion 51. (It should again be noted that the recess dimensions and spacings depicted are schematic and may be much smaller than those shown.)

As mentioned above, a film of lubricant may be provided between the first and second surfaces 12, 22 to reduce the friction between the sliding first and second components 10, 20. To help maintain the fluid film, the first and second recesses 11, 21 may be urged into a non-overlapping position by limiting relative axial movement of the first and second rotational bearing components 50, 60. For example, with reference to FIG. 9, a protrusion 52 may extend from the shaft portion 51 into a recess 62 in the inner wall 61. The recess 62 may extend about the circumference of the inner wall 61. The protrusion 52 may (or may not) extend about the circumference of the shaft portion 51. The protrusion 52 may comprise one or more abutment surfaces that engage corresponding abutment surfaces in the recess 62 and serve to limit axial movement of the shaft portion 51 relative to the inner wall 61. The interaction of the abutment surfaces may help maintain the first and second recesses 11, 21 in the non-overlapping positions. (Alternatively, the inner wall 61 may comprise the protrusion and the shaft portion 51 may comprise the recess or the abutment surfaces may be provided at other locations on or outside the rotational bearing.)

The above-described arrangements minimize frictional losses between the first and second components 10, 20 by maximizing the number of recesses per unit area, which better support the lubricating film between the surfaces 12, 22. The first and second components 10, 20 may be urged into a relative positon in which the first and second recesses do not overlap to limit the flow of lubricant between the first and second recesses. The benefits may be maximized as a result. The first and second components may be urged into such a relative position by virtue of the changing frictional forces encountered as the components move and/or by virtue of mechanical abutment surfaces. Furthermore, the above-described arrangements maximize the total number of recesses per unit area and simplify the manufacture of each component because the density of the recesses for a particular component is less than the total density and it is easier to manufacture a component with recesses spaced further apart.

It will be appreciated by those skilled in the art that although the invention has been described by way of example, with reference to one or more examples, it is not limited to the disclosed examples and alternative examples may be constructed without departing from the scope of the invention as defined by the appended claims.

The invention claimed is:

1. A bearing assembly comprising a first component and a second component, the first and second components being slidably disposed with respect to each other, wherein the first component slides relative to the second component in a first direction,
    wherein the first component comprises a plurality of first recesses formed in a first surface facing the second component, wherein the plurality of first recesses are distributed in a second direction perpendicular to the first direction with neighboring first recesses of the plurality of first recesses being spaced apart in the second direction with a first spacing,
    wherein the second component comprises a plurality of second recesses formed in a second surface facing the first surface of the first component, wherein the plurality of second recesses are distributed in the second direction with neighboring second recesses of the plurality of second recesses being spaced apart in the second direction with a second spacing,
    wherein the plurality of first recesses are sized to fit within the second spacings and the plurality of second recesses are sized to fit within the first spacings, and
    wherein the first and second components are urged into a relative position in the second direction in which the plurality of first recesses and the plurality of second recesses do not overlap one another by virtue of changing frictional forces as the second component moves in the second direction relative to the first component, and wherein the plurality of first recesses are interspersed relative to the plurality of second recesses, and wherein the second component is free to move in the second direction relative to the first component.

2. The bearing assembly of claim 1, wherein the bearing assembly is configured to receive a film of lubricant between the first and second surfaces and wherein the first and second recesses are configured to receive lubricant from the film.

3. The bearing assembly of claim 2, wherein the plurality of first recesses and the plurality of second recesses are offset such that the lubricant is not able to flow directly between the plurality of first recesses and the plurality of second recesses.

4. The bearing assembly of claim 1, wherein the first component comprises a plurality of rows of first recesses of the plurality of first recesses, each row of first recesses comprises first recesses distributed in the second direction, the rows of first recesses being aligned with one another in the first direction, and wherein the second component comprises a plurality of rows of second recesses of the plurality of second recesses, each row of second recesses comprises second recesses distributed in the second direction, the rows of second recesses being aligned in the first direction.

5. The bearing assembly of claim 1, wherein the first component moves linearly relative to the second component, and wherein an internal combustion engine, reciprocating machine, or rotating machine comprises the bearing assembly.

6. The bearing assembly of claim 1, wherein the first and second components are both at least partially cylindrical, wherein a piston assembly comprises the first component and a cylinder comprises the second component, the piston assembly being configured to reciprocate in the cylinder, wherein one of a piston and piston ring of the piston assembly comprises the first surface and a cylinder wall of the cylinder comprises the second surface.

7. The bearing assembly of claim 6, wherein the first direction is aligned with a longitudinal axis of the at least partially cylindrical first and second components.

8. The bearing assembly of claim 6, wherein the first direction is aligned with a circumferential direction of the at least partially cylindrical first and second components.

9. The bearing assembly of claim 1, wherein the plurality of first recesses each have a width in the second direction that is equal to or different from a width of each of the plurality of second recesses in the second direction.

10. The bearing assembly of claim 1, wherein the plurality of first recesses each have a width in the second direction that is substantially equal to the second spacing and the plurality of second recesses each have a width in the second direction that is substantially equal to the first spacing.

11. The bearing of claim 1, wherein the plurality of first recesses each have a width in the second direction that is less than the second spacing and the plurality of second recesses each have a width in the second direction that is less than the first spacing, wherein the difference between the first recess width and the second spacing and the difference between the second recess width and the first spacing are greater than the relative positional tolerance between the first and second components in the second direction.

12. A method for a bearing assembly comprising a first component and a second component, the first and second components being slidably disposed with respect to each other, wherein the first component slides relative to the second component in a first direction,
wherein the method comprises:
providing the first component with a plurality of first recesses in a first surface configured to face the second component, wherein the plurality of first recesses are distributed in a second direction perpendicular to the first direction with neighboring first recesses of the plurality of first recesses being spaced apart in the second direction with a first spacing; and
providing the second component with a plurality of second recesses in a second surface configured to face the first surface of the first component, wherein the plurality of second recesses are distributed in the second direction with neighboring second recesses of the plurality of second recesses being spaced apart in the second direction with a second spacing, wherein the plurality of first recesses are sized to fit within the second spacings and the plurality of second recesses are sized to fit within the first spacings, and urging the first and second components into a relative position in the second direction in which the plurality of first recesses and the plurality of second recesses do not overlap one another and the plurality of first recesses are interspersed relative to the plurality of second recesses, wherein the first and second components are both at least partially cylindrical, wherein a piston assembly comprises the first component and a cylinder comprises the second component, the piston assembly being configured to reciprocate in the cylinder, wherein one of a piston and piston ring of the piston assembly comprises the first surface and a cylinder wall of the cylinder comprises the second surface, and wherein the first direction is aligned with a circumferential direction of the at least partially cylindrical first and second components.

13. A system, comprising:
a first component comprising a first surface;
a second component comprising a second surface facing the first surface, wherein the first component and second component are configured to move about a first direction relative to one another; and
a plurality of first recesses arranged on the first surface and a plurality of second recesses arranged on the second surface, wherein the plurality of first recesses are spaced away from and do not overlap with the plurality of second recesses, and wherein a width of a first recess of the plurality of first recesses is less than a width of a gap between adjacent second recesses of the plurality of second recesses, and wherein a width of a second recess of the plurality of second recesses, which is equal to or different than the width of the first recess, is less than a width of a gap between adjacent first recesses of the plurality of first recesses, wherein the widths of the first recess, the second recess, and the gap are measured along a second direction perpendicular to the first direction, and wherein the second component is free to move in the second direction relative to the first component, and wherein the first and second components are urged into a relative position in the second direction in which the plurality of first and second recesses do not overlap one another by virtue of changing frictional forces as the second component moves in the second direction relative to the first component.

14. The system of claim 13, wherein the plurality of first recesses and the plurality of second recesses alternate along the second direction, wherein a second recess is positioned between adjacent first recesses of the plurality of first recesses and a first recess is positioned between adjacent second recesses of the plurality of second recesses.

* * * * *